United States Patent
Fischer et al.

(10) Patent No.: US 7,233,424 B2
(45) Date of Patent: Jun. 19, 2007

(54) STEERING ASSEMBLY WITH ELECTROMAGNETIC ACTUATORS

(75) Inventors: Paul F. Fischer, Fort Wayne, IN (US); Warren H. Miller, Palm Bay, FL (US); Kenneth D. White, Cocoa, FL (US); Reeder N. Ward, Melbourne, FL (US)

(73) Assignee: DOT Intellectual Properties, LLC, Fort Wayne, IN (US)

( * ) Notice: Subject to any disclaimer, the term of this patent is extended or adjusted under 35 U.S.C. 154(b) by 296 days.

(21) Appl. No.: 10/929,756

(22) Filed: Aug. 30, 2004

(65) Prior Publication Data

US 2006/0044655 A1 Mar. 2, 2006

(51) Int. Cl.
*G02B 26/08* (2006.01)

(52) U.S. Cl. ............... 359/196; 359/198; 359/199; 359/212; 359/225; 359/814

(58) Field of Classification Search ............... None
See application file for complete search history.

(56) References Cited

U.S. PATENT DOCUMENTS

| | | | | |
|---|---|---|---|---|
| 3,965,327 | A | 6/1976 | Ehlscheid et al. | 219/121 |
| 4,049,945 | A | 9/1977 | Ehlscheid et al. | 219/121 |
| 4,105,915 | A | 8/1978 | Clay et al. | 250/199 |
| 4,538,880 | A | 9/1985 | Reinhold | 350/6.6 |
| 4,670,638 | A | 6/1987 | Pavlin | 219/121 |
| 4,732,440 | A | 3/1988 | Godhok | 350/6.6 |
| 4,750,486 | A | 6/1988 | Butler et al. | 128/303.1 |
| 5,107,366 | A | * 4/1992 | Huang et al. | 359/223 |
| 5,268,554 | A | 12/1993 | Ream | 219/121.8 |
| 5,571,430 | A | 11/1996 | Kawasaki et al. | 219/121.78 |
| 5,676,866 | A | 10/1997 | in den Baumen et al. | 219/121.77 |
| 6,175,451 | B1 | 1/2001 | Iriyama et al. | 359/627 |
| 6,177,648 | B1 | 1/2001 | Lawson et al. | 219/121.62 |
| 2002/0068668 | A1 | 6/2002 | Chow et al. | 493/62 |

FOREIGN PATENT DOCUMENTS

| | | |
|---|---|---|
| EP | 0 977 066 | 2/2000 |
| FR | 2 690 532 | 10/1992 |

* cited by examiner

*Primary Examiner*—James Phan
(74) *Attorney, Agent, or Firm*—Baker & Daniels LLP (57) ABSTRACT

A laser cutting system, including a steering mirror assembly for directing a laser beam through a predetermined cutting path along a workpiece or substrate material. The steering mirror assembly includes a base, and a mirror pivotally supported on the base by a flexure assembly which confines pivotal movement of the mirror about a vertical Y-axis and/or about a horizontal X-axis. A pair of electrical actuator assemblies include movable bobbin assemblies connected to the mirror by control rod flexures at locations on the mirror which are spaced 90° apart from one another. In operation, selective electrical energization of the actuator assemblies controls movement of the bobbin assemblies to pivot the mirror about the vertical Y-axis and/or about the horizontal X-axis throughout a number of angular orientations to thereby direct the laser beam through a predetermined cutting operation pattern along the substrate surface to cut materials from the substrate. The flexure arrangements which support the mirror on the base and which connect the bobbin assemblies to the mirror facilitate substantially frictionless movement of the bobbin assemblies and the mirror, which allows the mirror to pivot at high operational speeds during the cutting sequence.

25 Claims, 11 Drawing Sheets

FIG_1

FIG_10

FIG._11

STEERING ASSEMBLY WITH ELECTROMAGNETIC ACTUATORS

BACKGROUND OF THE INVENTION

1. Field of the Invention

The present invention relates to a laser cutting system in which a laser beam is directed or steered through a predetermined cutting path along a substrate or workpiece to cut the substrate or workpiece. In particular, the present invention relates to a steering mirror assembly for directing the laser beam.

2. Description of the Related Art

Blister card packaging is used to package and display small items at a retail sale location. One example of blister card packaging is the packaging used for small batteries, which generally includes a blister card including various display and informational graphics, to which a plastic bubble piece or "blister" is attached for containing the batteries.

Typically, the foregoing types of packaging blister cards, display cards, clamshell inserts, etc., are printed on a large sheet of cardboard stock, and several different types of blister cards may optionally be printed on one sheet of cardboard stock to save material. A die-cutting process is used to cut the individual cards from the sheet of cardboard stock, requiring a custom-made die which is used with a press to cut the cards from the sheet of cardboard stock. Thereafter, the blister cards are removed from the sheet, stacked, and packaged for shipment to the product manufacturer.

A problem with this arrangement is that for each particular layout of blister cards on the blister card stock, i.e., for each customer order or production run, a custom-built die is needed. This requires the blister card producer to build and stock a large number of custom-made dies.

In view of the foregoing concerns, as well as similar concerns in other industrial applications, high power laser cutting systems have been developed for cutting articles from a substrate material or workpiece. In one approach, the substrate material itself is moved in two dimensions while the laser beam is held stationary. In another approach, the substrate material is held stationary while the laser-generating device is itself moved in two dimensions with respect to the substrate. In a still further approach, the substrate is held stationary, and a steering mirror assembly, including two or more separate, individually-controlled movable mirrors, is used to reflect and direct the laser beam along a cutting path. Typically, two mirrors are used, one controlling an X-axis component of direction of the laser beam and the other controlling a Y-axis component of direction of the laser beam. The individual mirrors are actuated by mechanical systems, such as motors, which are either directly connected to the mirrors or coupled to the mirrors through a gear drive, a screw drive, or other mechanical drive means.

Disadvantageously, because mechanical drive systems for mirrors used in laser steering systems incorporate mechanical drive components such as gears and belts, for example, friction is generated during operation, which limits the speeds at which the mirrors may be moved, and in turn limits the operational speeds at which the laser beam can process a substrate material or workpiece. Further, mechanical drive systems may be prone to failure due to mechanical fatigue or breakage, and typically require skilled maintenance to ensure that the drive systems operate properly.

What is needed is a laser cutting system for cutting articles from a substrate or workpiece which is an improvement over the foregoing.

SUMMARY OF THE INVENTION

The present invention provides a laser cutting system, including a steering mirror assembly for directing a laser beam through a predetermined cutting path along a workpiece or substrate material. The steering mirror assembly includes a base, and a mirror pivotally supported on the base by a flexure assembly which confines pivotal movement of the mirror about a vertical Y-axis and/or about a horizontal X-axis. A pair of electrical actuator assemblies include movable bobbin assemblies connected to the mirror by control rod flexures at locations on the mirror which are spaced 90° apart from one another. In operation, selective electrical energization of the actuator assemblies controls movement of the bobbin assemblies to pivot the mirror about the vertical Y-axis and/or about the horizontal X-axis throughout a number of angular orientations during a cutting operation to thereby direct the laser beam through a predetermined cutting pattern along the substrate surface to cut materials from the substrate. The flexure arrangements which support the mirror on the base and which connect the bobbin assemblies to the mirror facilitate substantially frictionless movement of the bobbin assemblies and the mirror, which allows the mirror to pivot at high operational speeds during the cutting operation.

In particular, the mirror is supported upon the base assembly by a V-shaped mirror support flexure and by a center rod flexure. The center rod flexure is bendable to facilitate twisting and/or bending movement of the legs of the V-shaped mirror support flexure as the mirror is pivoted by the electrical actuator assemblies. The electrical actuator assemblies are "voice-coil"-type electromagnets, each including a bobbin movable within a field magnet housing responsive to the input of electrical current into the coil of the bobbin. The electrical current input into the bobbin coils may be reversed to drive movement of the bobbins in forward and rearward directions with respect to the fixed field magnet housings in which the bobbins are received. The bobbins are rigidly connected to scale cylinders and to control rod flexures, and the control rod flexures in turn are rigidly connected to the mirror in a spaced relationship from one another. The bobbin assembly of one of the electrical actuator assemblies is operable to pivot the mirror in first and second, forward and rearward directions about a vertical Y-axis, while the bobbin assembly of the other electrical actuator assemblies is operable to pivot the mirror in first and second, forward and rearward directions about a horizontal X-axis. During operation of the steering mirror assembly, both of the electrical actuator assemblies are operable concurrently to pivot the mirror throughout a number of angular orientations to direct or steer the laser beam along a predetermined cutting path.

Advantageously, the mirror is mounted to the base assembly by an arrangement of flexures, and movement of the mirror is controlled by a pair of electrical actuator assemblies which are connected to the mirror through additional flexure arrangements, wherein the foregoing flexure arrangements substantially eliminate mechanical friction in the steering mirror assembly during operation. Elimination of mechanical friction enables the steering mirror assembly to pivot the mirror at very high operational speeds to facilitate rapid cutting of a substrate material, and additionally preserves and increases the operational life of the steering mirror assembly.

The scale cylinders of the bobbin assemblies include a bar code or other position identifying structure, which facilitates identification of the movement and the position of the bobbin assemblies by fixed optical feedback sensors. In this manner, optical feedback data is generated and provided to the computer control of the steering mirror assembly for closed loop monitoring of the operation of the steering mirror assembly.

In one form thereof, the present invention provides a steering mirror assembly, including a base; a mirror pivotally supported on the base; and at least one electromagnetic actuator assembly, including a housing connected to the base; a bobbin assembly movable with respect to the housing, the bobbin assembly including a first portion disposed within the housing, and a second portion disposed externally of the housing and connected to the mirror, the second portion supported on the base by at least one support flexure, whereby linear movement of the bobbin assembly pivots the mirror about a first axis.

In another form thereof, the present invention provides a steering mirror assembly, including a base; a mirror pivotally supported on the base; a first electromagnetic actuator assembly, including a housing connected to the base; a bobbin assembly including a first portion movable within the housing and a second portion connected to the mirror at a first location on the mirror, the second portion supported on the base by a flexure assembly substantially confining movement of the second portion linearly to thereby pivot the mirror about a first axis; and a second electromagnetic actuator assembly, including a housing connected to the base; a bobbin assembly including a first portion movable within the housing and a second portion connected to the mirror at a second location on the mirror angularly spaced from the first location the second portion supported on the base by a flexure assembly substantially confining movement of the second portion linearly to thereby pivot the mirror about a second axis.

In a further form thereof, the present invention provides a laser cutting system, including a sheet of substrate material; a laser generating a laser beam along a path; at least one optical component disposed in the path of the laser beam, the optical component selected from the group consisting of a mirror and a lens; and a steering mirror assembly disposed in the path of the laser beam, the steering mirror assembly including a base; a mirror pivotally supported on the base; and at least one electromagnetic actuator assembly, including a housing connected to the base, a bobbin assembly connected to the mirror and disposed at least partially within the housing, the bobbin assembly movably supported on the base for movement by at least one support flexure, whereby movement of the bobbin assembly pivots the mirror about a first axis to guide the laser beam toward the sheet of substrate material.

BRIEF DESCRIPTION OF THE DRAWINGS

The above-mentioned and other features and advantages of this invention, and the manner of attaining them, will become more apparent and the invention itself will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention any manner.

DETAILED DESCRIPTION

Figure 1:
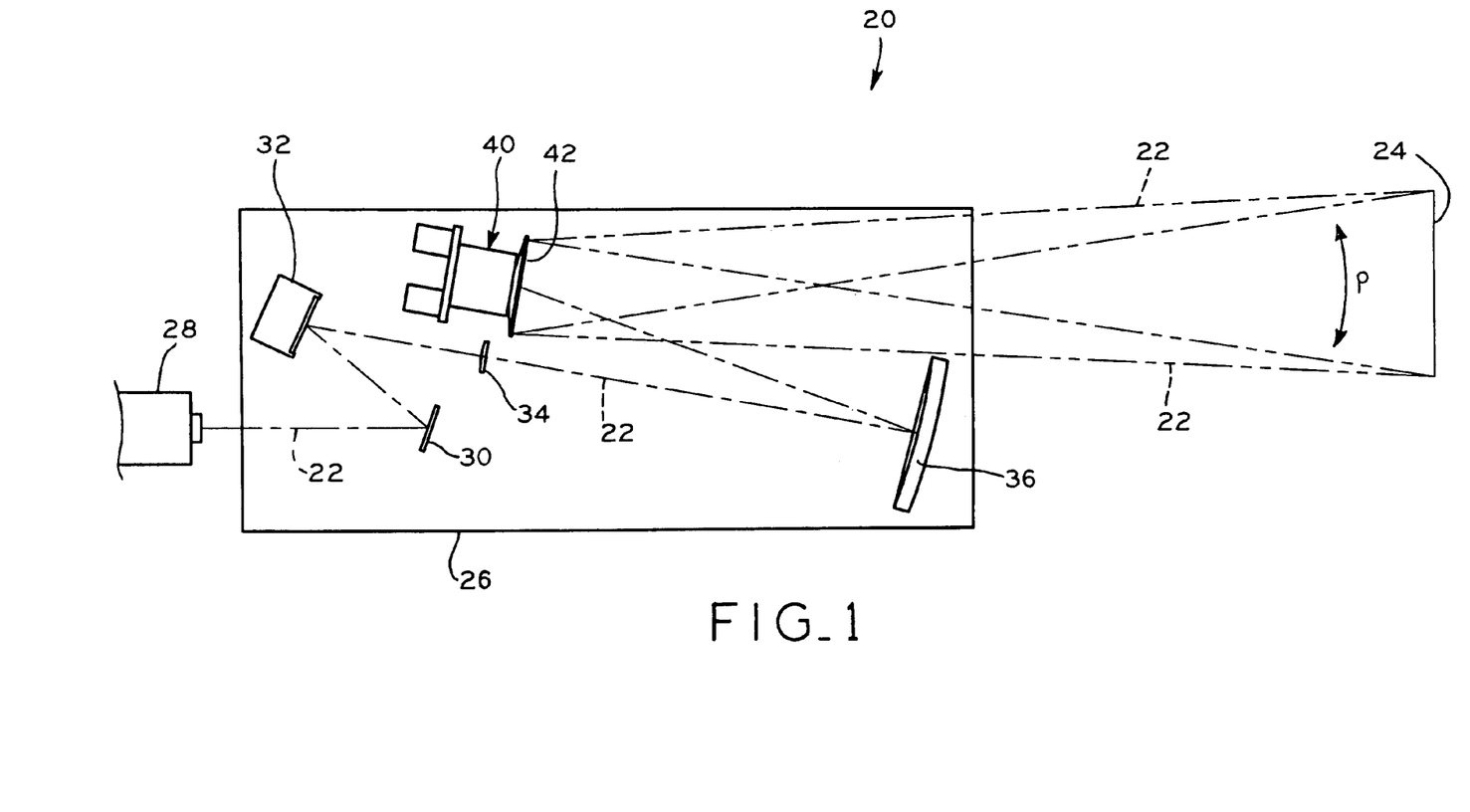
FIG. 1 is a top, schematic view of a laser cutting system, including a steering mirror assembly in accordance with the present invention.

Referring to FIG. 1, the optical components of laser cutting system 20 are shown. In operation, laser cutting system 20 sweeps a cutting laser beam 22 along a cutting path P over the surface of a sheet of substrate material 24 to cut out individual pieces or articles from the substrate material 24. The optical components of laser cutting system 20 are shown in FIG. 1 in a top view, in which the components of laser cutting system 20 are arranged on a horizontal support surface 26 and the substrate material 24 is disposed vertically. However, the orientation of one or more of the components of laser cutting system 20, as well as the orientation of substrate material 24 may vary as desired; for example, the components of laser cutting system 20 may be arranged vertically, with substrate material 24 arranged horizontally.

Substrate material 24 may be any type of material which is to be cut, etched, or otherwise processed by laser cutting system 20, such as a sheet of paperboard material or blister card stock, or a metal or plastic substrate, for example, and may be held in position by a suitable support structure (not shown). The support structure may hold substrate material 24 mechanically or by vacuum, for example. Also, laser cutting system 20 may optionally be used with an automated feeding system (not shown) which, during each cutting operation, moves a sheet of substrate material 24 into position for cutting, holds the sheet in position during cutting of the sheet by laser beam 22, and then moves the sheet away from laser cutting system 20 and/or separates the cut articles from the remainder of the sheet. Thereafter, the foregoing process is repeated in another cutting operation.

Laser cutting system 20 includes laser 28 which generates laser beam 22, which sequentially reflects off of an astigmat 30, reflects off of a vari-focal mirror 32, passes through a short focal length lens 34, reflects off of a focusing mirror 36, and is directed by a steering mirror assembly 40 to sweep in a predetermined cutting pattern over substrate material 24. Laser 28 may be a known high-powered $CO_2$ industrial cutting laser, for example, having a power between 1000 and 2500 Watts. Such lasers are available from many commercial sources. Laser 28 generates laser beam 22 and initially directs same to astigmat 30, an astigmatic mirror which corrects for any astigmatism within laser beam 22.

Laser beam 22 is reflected by astigmat 30 to vari-focal mirror 32, which operates to vary the width of laser beam 22 and in turn to vary the focal distance of laser beam 22, i.e., the point from laser 28 at which laser beam 22 focuses to a point. In one exemplary configuration, vari-focal mirror 32 may be a convex-shaped mirror which is bendable in a controlled manner to vary the curvature of the mirror and thereby selectively vary the width of laser beam 22. Varying the width of laser beam 22 in turn varies the focal distance of laser beam 22. As laser beam 22 is swept across the surface of substrate 24 by steering mirror assembly 40 in the manner discussed below, the linear distance traveled by laser beam 22 between steering mirror assembly 40 and substrate 24 varies. Thus, vari-focal mirror 32 operates to vary the width of laser beam 22, and in turn the focal distance of laser beam 22, concurrently with the operation of steering mirror assembly 40 such that laser beam 22 is focused at a point on substrate 24 for cutting, regardless of the angular orientation of steering mirror assembly 40 and the resulting linear distance traveled by laser beam 22 to substrate 24. However, depending upon factors such as the distance between steering mirror assembly 40 and substrate 24, as well as the degree of angular sweep of laser beam 22, vari-focal mirror 32 may not be needed in some applications.

As shown in FIG. 1, after laser beam 22 is reflected by vari-focal mirror 32, laser beam 22 then passes through short focal length lens 34, and is reflected by focusing mirror 36 to steering mirror assembly 40. In the embodiment of FIG. 1, laser beam 22 is focused by short focal length lens 34 and focusing mirror 36 to converge to a point at substrate 24. Mirror 42 of steering mirror assembly 40 is flat and does not focus laser beam 22, but rather directs laser beam 22 along a predetermined cutting path across substrate 24. In a modified embodiment, however, mirror 42 of steering mirror assembly 40 could be curved, such that mirror 42 would both focus laser beam 22 and direct same in a cutting path across substrate 24. As discussed in detail below, mirror 42 is pivoted in a controlled manner by steering mirror assembly 40 to direct the position of the point of laser beam 22 along substrate material 24 according to a predetermined cutting pattern to make selected cuts in substrate material 24.

Figure 2:
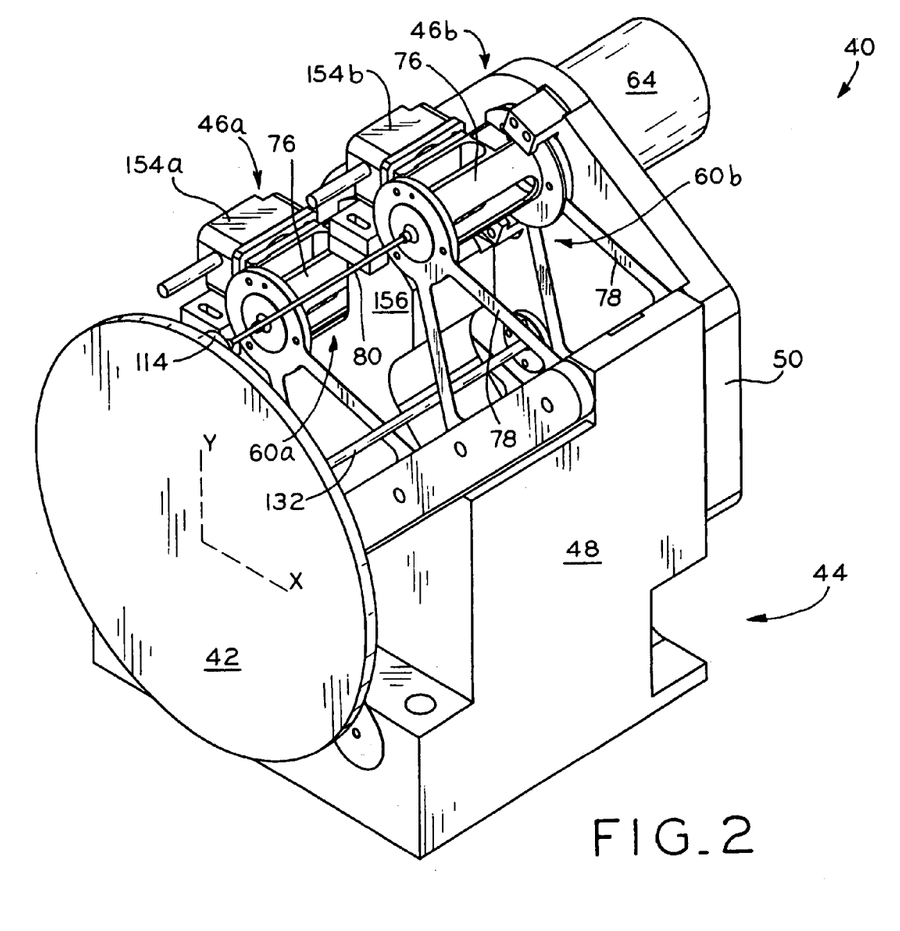
FIG. 2 is a front perspective view of the steering mirror assembly, with the mirror disposed in a reference or non-pivoted position.
Figure 3:
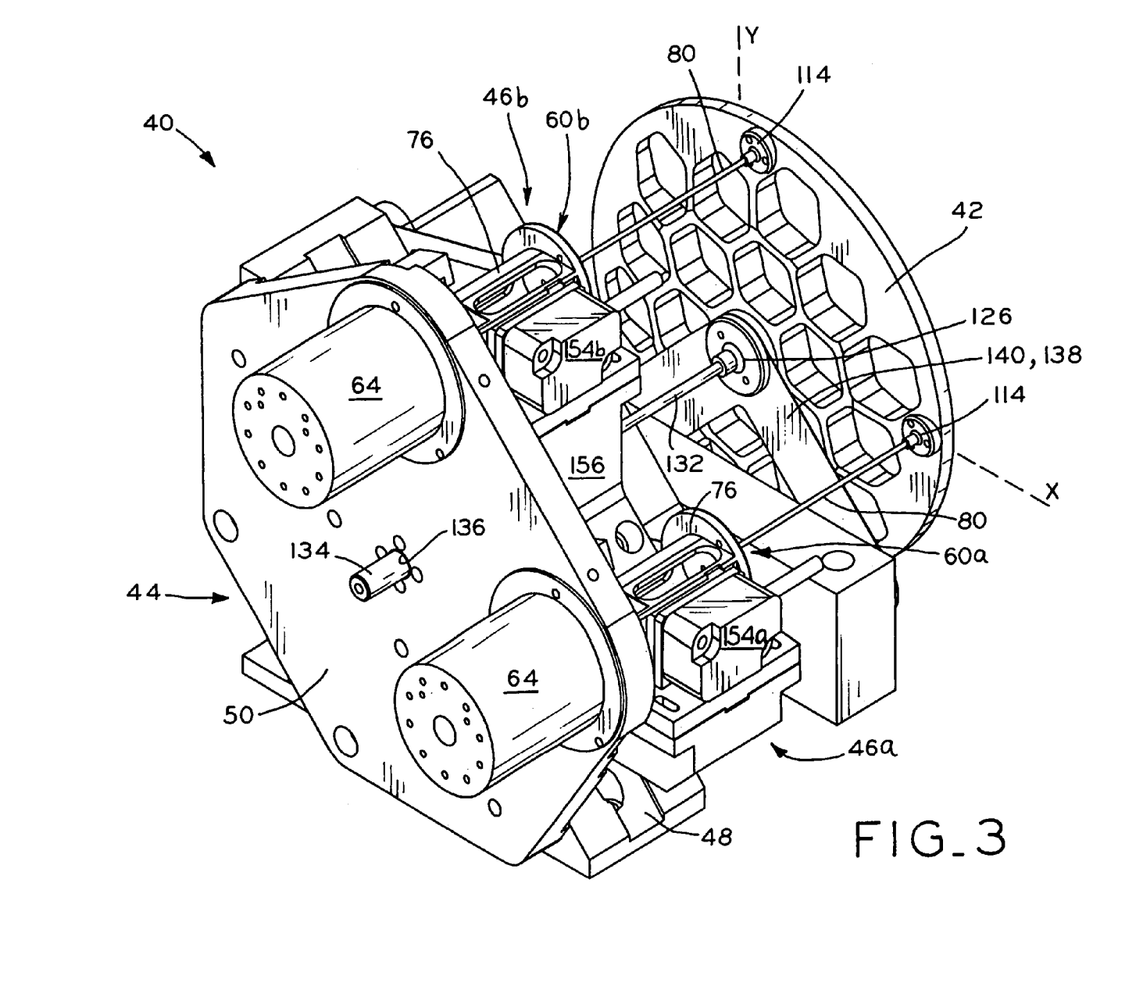
FIG. 3 is a rear perspective view of the steering mirror assembly, with the mirror disposed in a reference or non-pivoted position.
Figures 4, 5:
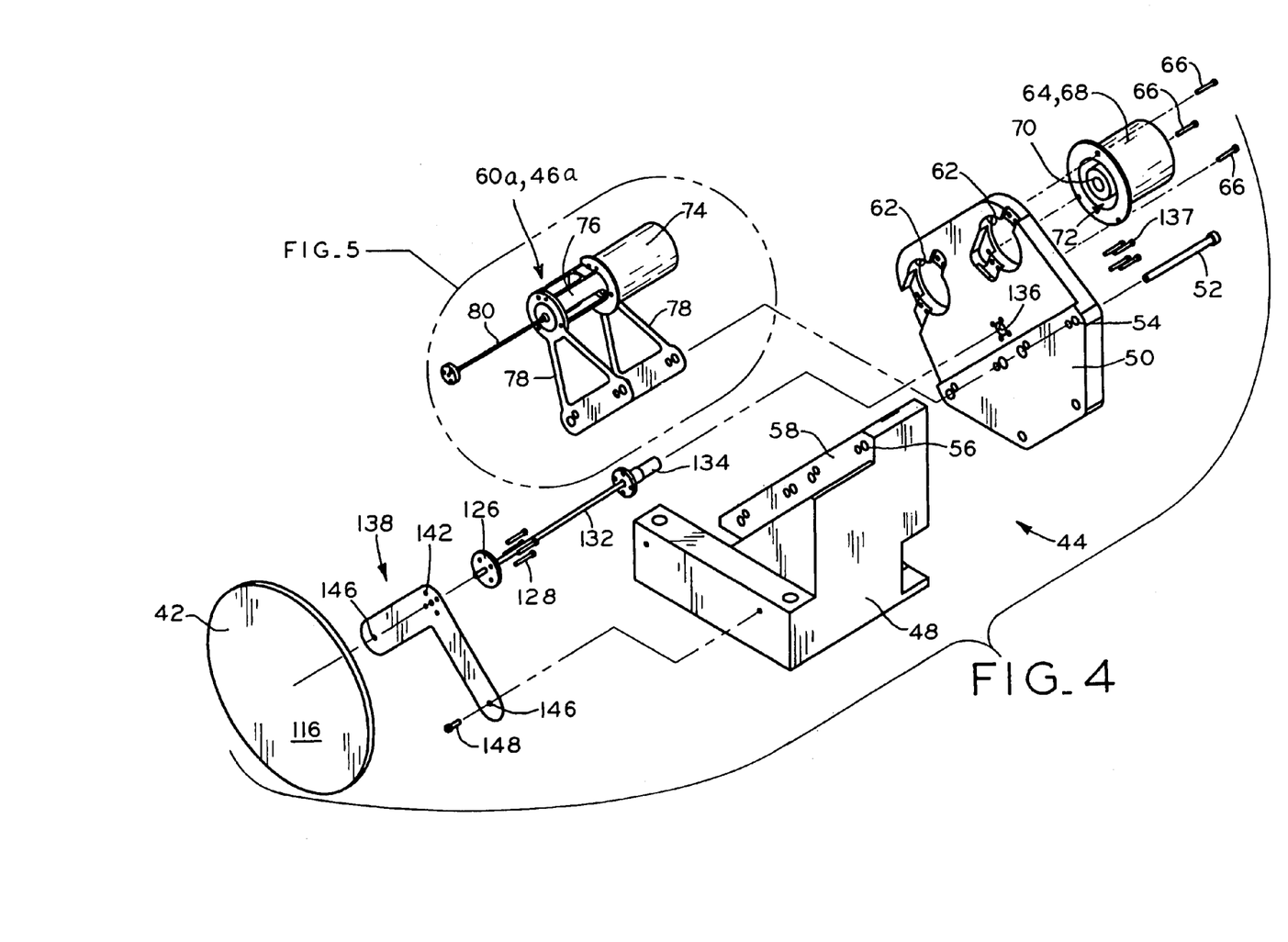
FIG. 4 is an exploded view showing various components of the steering mirror assembly, including the pedestal and back plate of the base, an actuator assembly with a bobbin assembly, and the mirror.
FIG. 5 is an exploded view of the bobbin assembly of FIG. 4.
Figure 5:
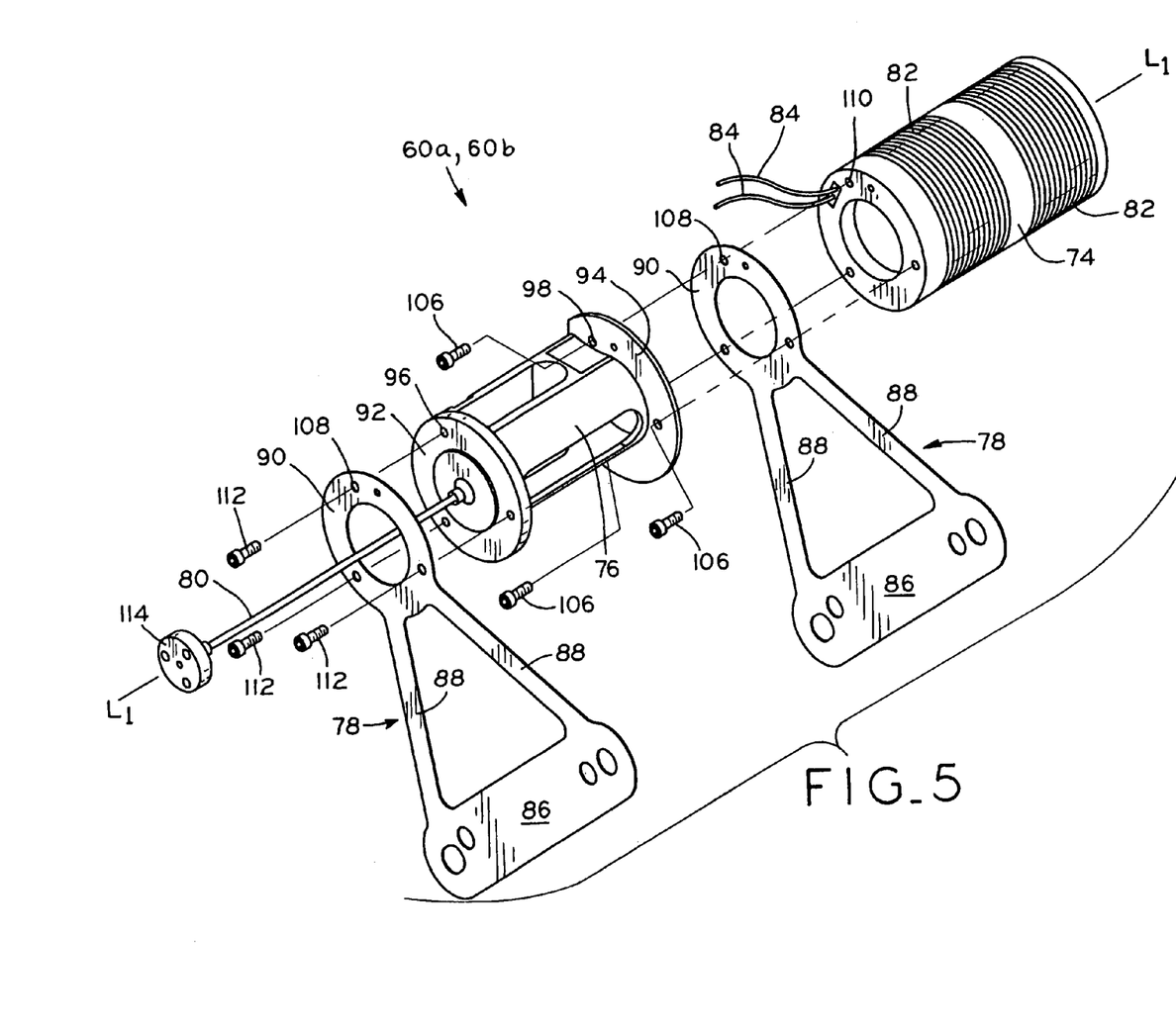

Referring to FIGS. 2–4, steering mirror assembly 40 includes a base 44 to which mirror 42 and a pair of actuator assemblies 46a and 46b are mounted. As discussed below, both mirror 42 and the movable components of actuator assemblies 46a and 46b are supported on base 44 by a plurality of flexures, which facilitate the controlled, substantially frictionless pivotal movement of mirror 42 by actuator assemblies 46 to direct the laser beam 22 along substrate material 24.

Referring to FIG. 4, base 44 of steering mirror assembly 40 includes pedestal 48 rigidly mounted to support surface 26 (FIG. 1) in a suitable manner. Base 44 also includes back plate 50 rigidly attached to pedestal 48 by a plurality of elongated fasteners 52, such as socket head cap screws, which pass through sets of apertures 54 in back plate 50 and apertures 56 along ramp surface 58 of pedestal 48. As discussed in greater detail below, the support flexures of each of a pair of first and second bobbin assemblies 60a and 60b of first and second actuator assemblies 46a and 46b, respectively, are anchored to ramp surface 58 of pedestal 48 by fasteners 52 in vertically spaced relation. Referring to FIGS. 2 and 3, the first or lower bobbin assembly 60a of a first or lower actuator assembly 46a pivots mirror 42 about a vertical Y-axis, and the second or upper bobbin assembly 60b of a second or upper actuator assembly 46b pivots mirror 42 about a horizontal X-axis in the manner described below. In FIG. 4, only the lower, first bobbin assembly 60a of the first actuator assembly 46a is shown in for clarity.

As shown in FIG. 4, back plate 50 includes a pair of openings 62, and a pair of field magnet housings 64 (only one of which is shown in FIG. 4) are secured by a plurality of fasteners 66 to the rear face of back plate 50 in alignment with openings 62. Field magnet housings 64 are cylindrically-shaped, magnetic metal components, and include outer housing portion 68 and inner housing portion 70 defining an annular space or gap 72 therebetween.

First and second bobbin assemblies 60a and 60b of first and second actuator assemblies 46a and 46b are respectively associated with the pair of field magnet housings 64, and are connected to mirror 42 in the manner described below to control the pivotal movement of mirror 42. Referring additionally to FIG. 5, each bobbin assembly 60 generally includes bobbin 74, scale cylinder 76, a pair of V-shaped bobbin support flexures 78, and a control rod flexure 80. Bobbin 74 is formed as a cylinder of magnetic metal, such as iron or aluminum, wrapped with a wire coil 82 which includes a pair of electrical leads 84 for supplying electrical current to coil 82. Bobbin 74 is received within gap 72 (FIG. 4) defined between outer housing portion 68 and inner housing portion 70 of field magnet housing 64, with an air gap disposed between bobbin 74 and each of outer and inner housing portions 68 and 70 of field magnet housing 64. Bobbins 74 and field magnet housings 64 are "voice coil"-type electromagnets, in which the input of electrical current into leads 84 energizes coil 82 and magnetizes bobbin 74, thereby inducing axial movement of bobbin 74 within its housing 64. The electrical current through leads 84 and coil 82 may be selectively reversed by changing the input of electrical charge on the two leads 84 of coil 82 to reverse the polar orientation of the magnetized bobbin 74, which in turn reverses the direction of axial movement of bobbin 74 within its housing 64.

Bobbin assemblies 60a and 60b also include a pair of identical V-shaped support flexures 78, each formed of thin sheet of stainless steel. As used herein, the term "flexure" generally refers to a frictionless device which relies upon the elastic deformation of the solid material of which the flexure is made to have a low stiffness in a direction of required motion but a very high stiffness in other directions. Each support flexure 78 includes base portion 86 rigidly attached to ramped surface 58 of pedestal 48 by elongated fasteners 52, as shown in FIG. 4, and a pair of flexure arms 88 extending from base portion 86 to ring portion 90. Support flexures 78 are shaped such that with base portion 86 thereof rigidly anchored to pedestal 48, flexure arms 88 and ring portion 90 are together flexibly movable in a confined, bending manner with respect to base portion 86 along line $L_1$—$L_1$.

Scale cylinder 76 is formed of a lightweight material with high structural strength, such as aluminum, and generally includes front face 92 and rear face 94, each including sets of apertures 96 and 98, respectively. Additionally, referring to FIG. 6, scale cylinder 76 includes a planar outer face 100 bounded by ridges 102. Scale member 104 includes a bar code or other electrically or optically detectable structure thereon for cooperating with optical feedback sensors 154a and 154b (FIGS. 2, 3, and 11) as discussed below. Scale member 104 is rigidly secured to outer face 100 of scale cylinder 76 with a suitable adhesive, with the edges of scale member 104 in tight, confined abutment with ridges 102 of scale cylinder 76 to prevent movement of scale member 104 with respect to scale cylinder 76.

Referring back to FIG. 5, fasteners 106 are inserted through apertures 98 in rear face 94 of scale cylinder 76, through apertures 108 in ring portion 90 of the rearward support flexure 78, and into apertures 110 in bobbin 74 to rigidly secure scale cylinder 76 to bobbin 74 with ring portion 90 of the rearward support flexure 78 sandwiched therebetween. Additionally, fasteners 112 are inserted through apertures 108 in ring portion 90 of the forward support flexure 78 and into apertures 96 of front face 92 of scale cylinder 76 to rigidly secure the forward support flexure 78 to scale cylinder 76. Control rod flexure 80 includes a first end rigidly mounted to front face 92 of scale cylinder 76, and an opposite end rigidly mounted to control rod flange 114, which is in turn mounted to mirror 42 in the manner described below.

Figure 6:
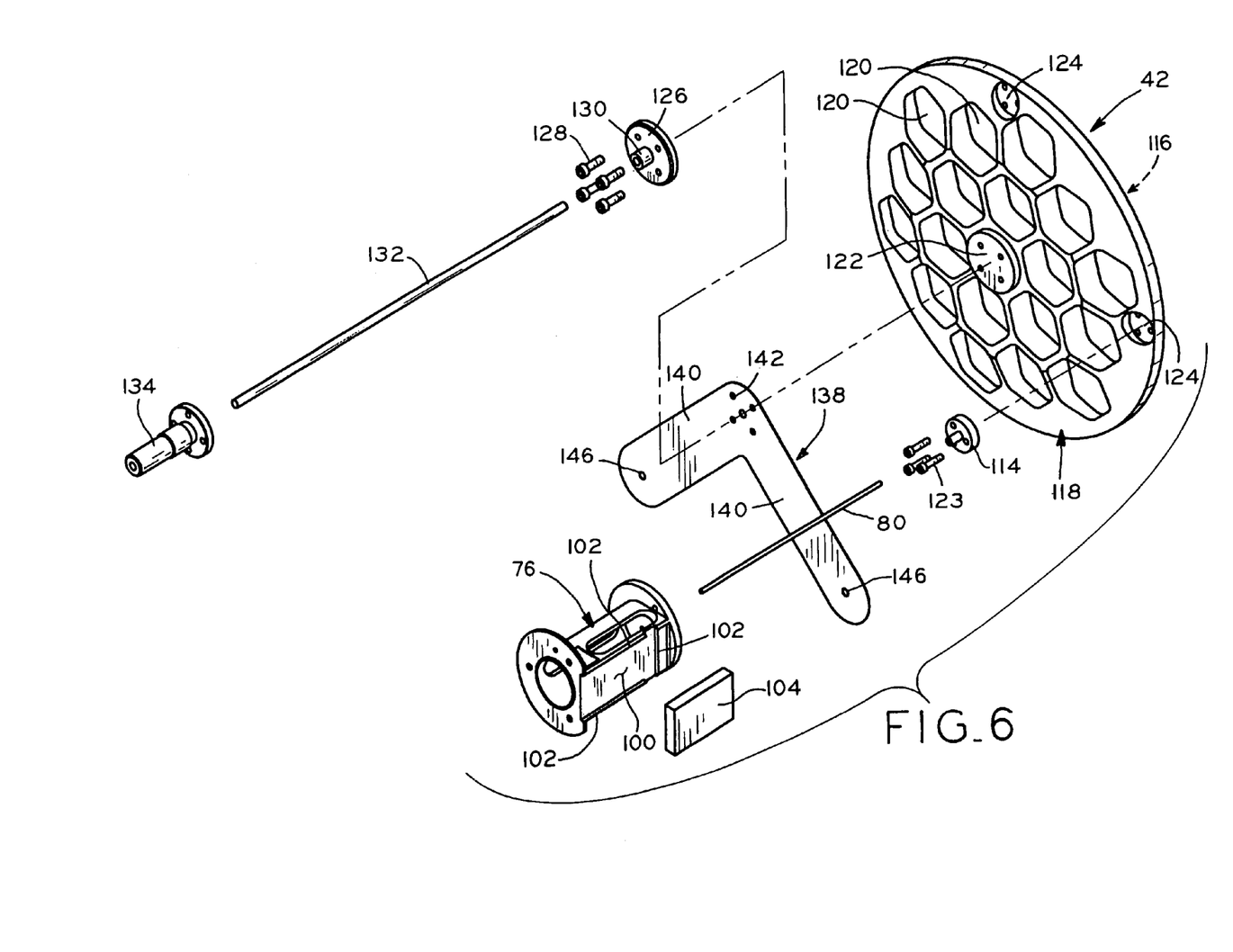
FIG. 6 is an exploded view showing the flexure assemblies connecting the mirror to the base and to the bobbin assemblies.

Referring to FIGS. 4 and 6, mirror 42 is configured as a circular mirror made of beryllium or other lightweight material, and includes a flat, reflective front face 116. The opposite, rear side 118 of mirror 42 includes a plurality of hexagonal-profiled recesses or pockets 120 to reduce the overall weight of mirror 42. In an exemplary embodiment, mirror 42 is approximately 6 inches in diameter; however, the overall diameter of mirror 42, as well as the shape of mirror 42, may vary. Generally, however, the mass of mirror 42 increases with increasing diameter, such that larger mirrors may present more inertial resistance to movement by steering mirror assembly 40. Rear side 118 of mirror 42 includes a centrally disposed attachment surface 122, as well as a pair of peripheral attachment surfaces 124 disposed adjacent the peripheral edge of mirror 42 and spaced 90° apart from one another, to which control rod flanges 114 of bobbin assemblies 60a and 60b are attached with fasteners 123, as shown in FIG. 6.

A first center rod mount 126 is secured to central attachment surface 122 of mirror 42 by fasteners 128, and includes boss 130. Center rod flexure 132 includes one end received within boss 130 of first center rod mount 126, as shown in FIG. 6, and the opposite end of center rod flexure 132 is attached to a second center rod mount 134 which, as shown in FIG. 4, is received through aperture 136 in back plate 50 of base 44 and attached thereto with fasteners 137. An adhesive may be applied between the ends of center rod flexure 132 and boss 130 of first center rod mount 126 and second center rod mount 134 to secure the foregoing components together.

A V-shaped mirror support flexure 138 is provided for pivotally supporting mirror 42 on pedestal 48, and includes a pair of legs 140 and a series of first apertures 142 through which fasteners 128 are inserted to thereby capture mirror support flexure 138 between center rod mount 126 of center rod flexure 132 and central attachment surface 122 of mirror 42. Legs 140 of mirror support flexure 138 extend generally downwardly, and each includes an aperture 146 for receipt of fasteners 148 to rigidly secure legs 140 to pedestal 48, as shown in FIG. 4. Mirror support flexure 138 is formed as a thin sheet of stainless steel and, together with center rod flexure 132, supports mirror 42 on pedestal 48 in a manner in which mirror 42 is confined to pivotal movement about a horizontal X-axis and/or a vertical Y-axis in the manner described below.

Referring to FIGS. 7–10, the pivotal movement of mirror 42 about a vertical Y-axis by the lower actuator assembly 46a, and the pivotal movement of mirror 42 about a horizontal X-axis by upper actuator assembly 46b will be described. Although the upper actuator assembly 46b is not shown in FIGS. 7 and 8 for clarity, and the lower actuator assembly 46a is not shown in FIGS. 9 and 10 for clarity, it should be understood that the lower and upper actuator assemblies 46a and 46b are operable in a substantially identical manner, except as discussed below.

As shown in FIG. 3, it may be seen that the control rod flexure 80 of the bobbin assembly 60b of upper actuator assembly 46b is connected to a peripheral attachment surface 124 of mirror 42 which is spaced 90° from the peripheral attachment surface 124 of mirror 42 to which the control rod flexure 80 of the bobbin assembly 60a of lower actuator assembly 46a is connected. In this manner, lower actuator assembly 46a pivots mirror about a vertical Y-axis, while upper actuator assembly 46b pivots mirror 42 about a horizontal X-axis. Notably however, during operation of steering mirror assembly 40, both the upper and lower actuator assemblies 46a and 46b are operable concurrently to pivot mirror 42 concurrently about both the vertical Y-axis and the horizontal X-axis, such that mirror 42 is rapidly pivoted through an essentially infinite number of angular orientations which have both a Y-axis component and an X-axis component, to thereby direct or steer laser beam 22 in a predetermined path along substrate 24. In this manner, laser beam 22 may be directed by steering mirror assembly 40 along substrate 40 along straight vertical and horizontal lines, angled lines, and curved lines.

In FIG. 3, the bobbin assemblies 60a and 60b of lower and upper actuator assemblies 46a and 46b are each shown in a neutral or reference position, in which mirror 42 is not pivoted about the vertical Y-axis or about the horizontal X-axis. In this position, mirror 42 is oriented in a plane which includes both the vertical Y-axis and the horizontal X-axis.

Figure 7:
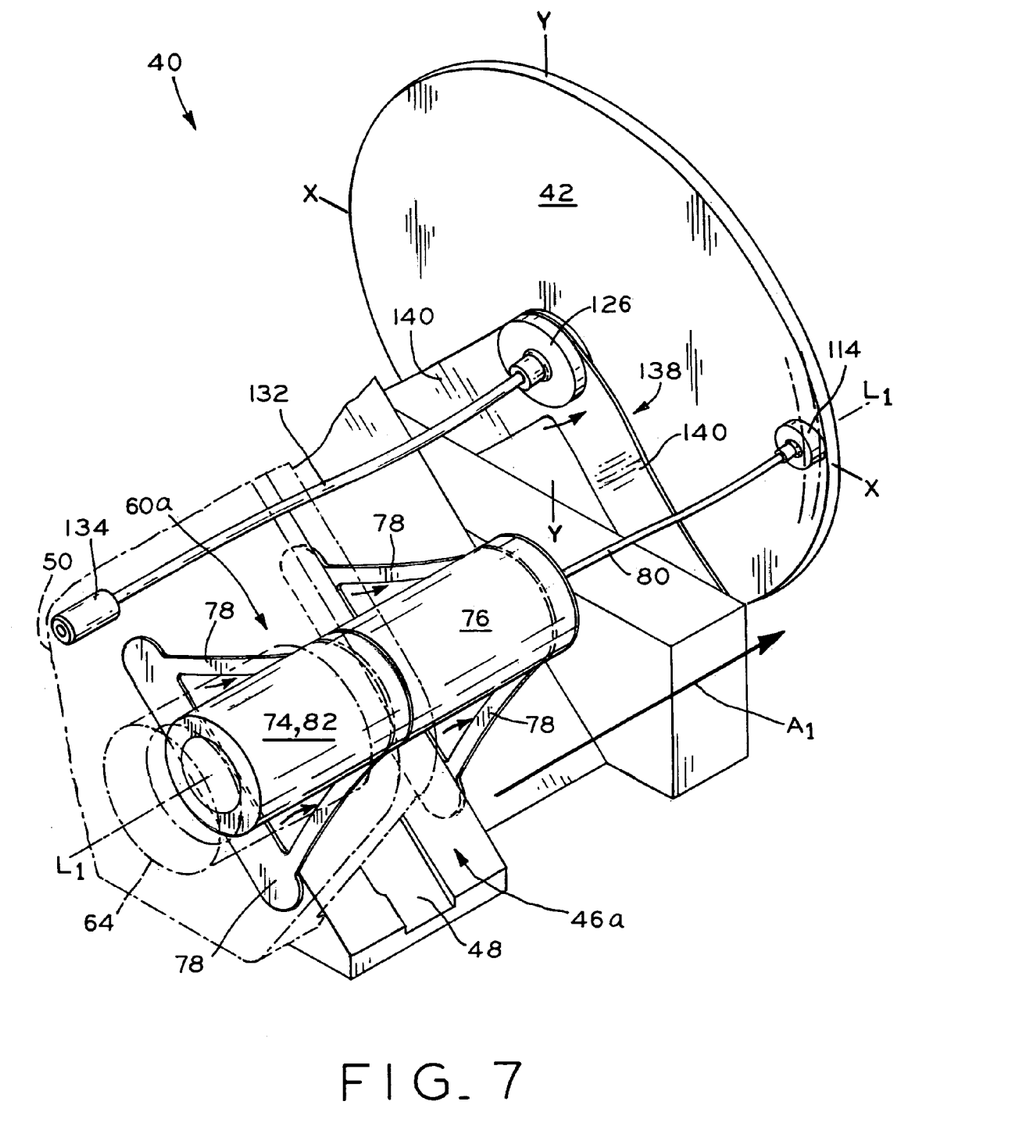
FIG. 7 is a partial perspective view of the steering mirror assembly, showing actuation of the first or lower actuator assembly to pivot the mirror in a first, forward direction about the vertical Y-axis, with the second or upper actuator assembly removed for clarity.

As described above, bobbins 74 of bobbin assemblies 60a and 60b are movable axially within field magnet housings 64 in two directions along lines $L_1$—$L_1$ responsive to the electrical current input into bobbin 74. Specifically, referring to FIG. 7 with reference to lower actuator assembly 46a, when electrical current is applied to coil 82 of bobbin 74, bobbin 74 moves in the direction of arrow $A_1$ from an initial position, shown in dashed lines in FIG. 7, toward a forward position, shown in solid lines in FIG. 7, in which bobbin 74 extends from field magnet housing 64 along line $L_1$—$L_1$ to an extent which is proportional to the amount of electrical current applied to coil 82 of bobbin 74. Scale cylinder 76, ring portions 90 of support flexures 78, and control rod flexure 80, which are rigidly attached to bobbin 74, move together with bobbin 74. As shown in FIG. 7, support flexures 78 are bendable together in the direction of arrow $A_1$ along line $L_1$—$L_1$ to confine the movement of bobbin assembly 60a to substantially axial movement in the forward direction along line $L_1$—$L_1$. Due to the rigid connections of the opposite ends of control rod flexure 80 to scale cylinder 76 and to mirror 42, respectively, movement of bobbin assembly 60a in a first or forward direction also pivots mirror 42 about mirror support flexure 138 and the end of center rod flexure 132 in a first or forward direction about the vertical Y-axis from an initial position, shown in dashed lines in FIG. 7, to a second position, shown in solid lines in FIG. 7.

As shown in FIG. 7, upon linear movement of bobbin assembly 60a in a forward direction along line $L_1$—$L_1$, both control rod flexure 80 and center rod flexure 132 may bend slightly into an S-shape, which bending has been shown somewhat exaggerated in FIG. 7 for clarity. Additionally, as also shown in FIG. 7 during pivoting of mirror 42 about the vertical Y-axis upon movement of bobbin assembly 60a, mirror support flexure 138 undergoes a type of twisting movement, in which legs 140 of mirror support flexure 138 each slightly twist in respective opposite directions about fulcrums provided by the rigid attachment of the ends of legs 140 to pedestal 48.

Figure 8:
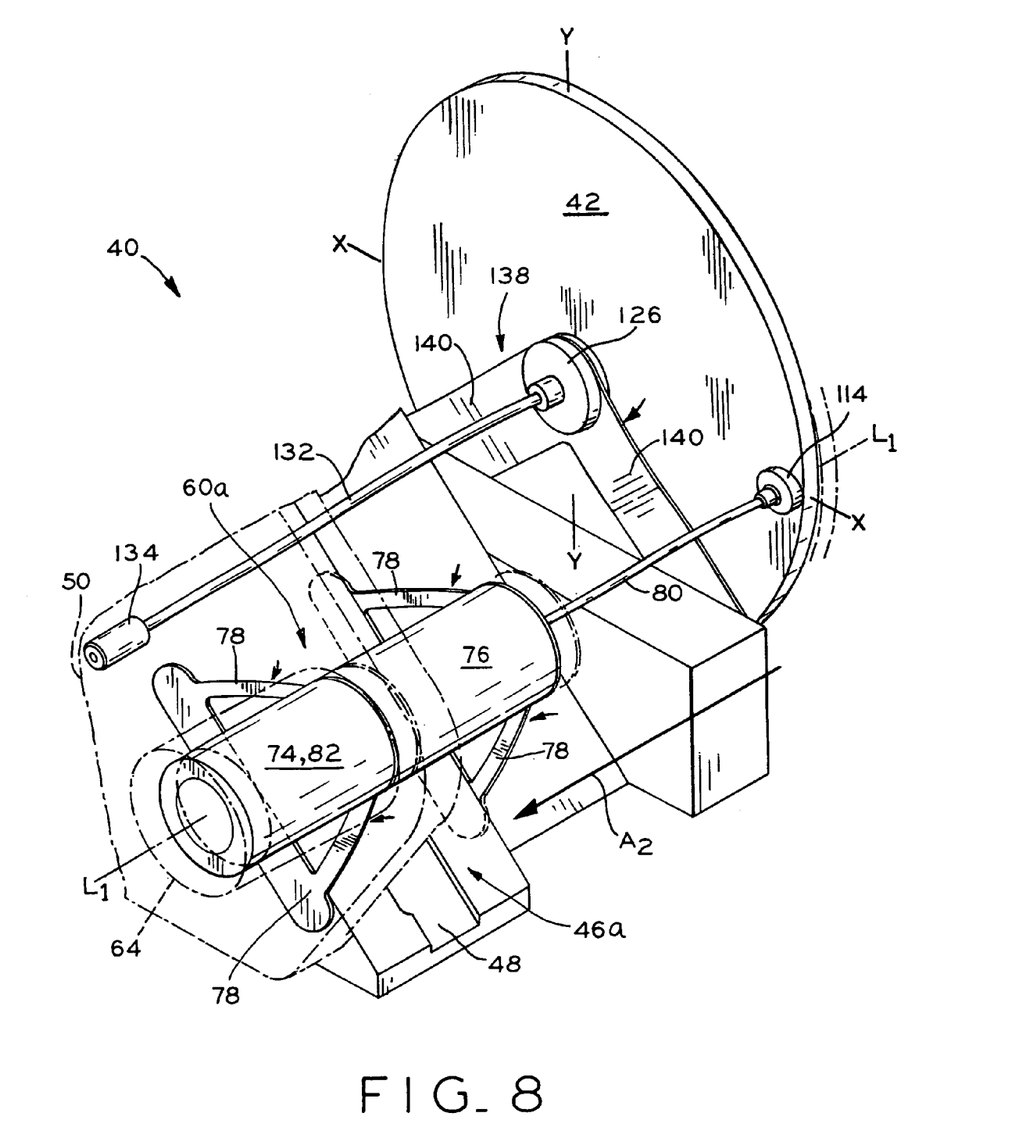
FIG. 8 is a partial perspective view of the steering mirror assembly, showing actuation of the first or lower actuator assembly to pivot the mirror in a second, rearward direction about the vertical Y-axis, with the second or upper actuator assembly removed for clarity.

Referring to FIG. 8, when the electrical current which is applied to coil 82 of bobbin 74 is reversed, bobbin 74 moves in the direction of arrow $A_2$ from an initial position, shown in dashed lines in FIG. 8, toward a rearward position, shown in solid lines in FIG. 8, in which bobbin 74 retracts into field magnet housing 64 along line $L_1$—$L_1$ to an extent which is proportional to the amount of electrical current applied to coil 82 of bobbin 74. Similar to the forward movement described above, scale cylinder 76, ring portions 90 of support flexures 78, and control rod flexure 80, which are rigidly attached to bobbin 74, move together with bobbin 74. As shown in FIG. 8, support flexures 78 are bendable together along line $L_1$—$L_1$ to confine the movement of bobbin assembly 60a to substantially axial movement in the rearward direction along line $L_1$—$L_1$. Due to the rigid connections of the opposite ends of control rod flexure 80 to scale cylinder 76 and to mirror 42, respectively, movement of bobbin assembly 60a also pivots mirror 42 about mirror support flexure 136 and the end of center rod flexure 132 in a second or rearward direction about the vertical Y-axis from an initial position, shown in dashed lines in FIG. 8, to a second position, shown in solid lines in FIG. 8.

As shown in FIG. 8, upon linear movement of bobbin assembly 60a in a reverse direction along line $L_1$—$L_1$, both control rod flexure 80 and center rod flexure 132 may bend slightly into an S-shape, which bending has been shown somewhat exaggerated in FIG. 8 for clarity. Additionally, as also shown in FIG. 8 during pivoting of mirror 42 about the vertical Y-axis upon movement of bobbin assembly 60a, mirror support flexure 138 undergoes a type of twisting movement which is substantially opposite to the twisting movement shown in FIG. 7, in which legs 140 of mirror support flexure 138 each slightly twist in respective opposite directions about fulcrums provided by the rigid attachment of the ends of legs 140 to pedestal 48.

Figure 9:
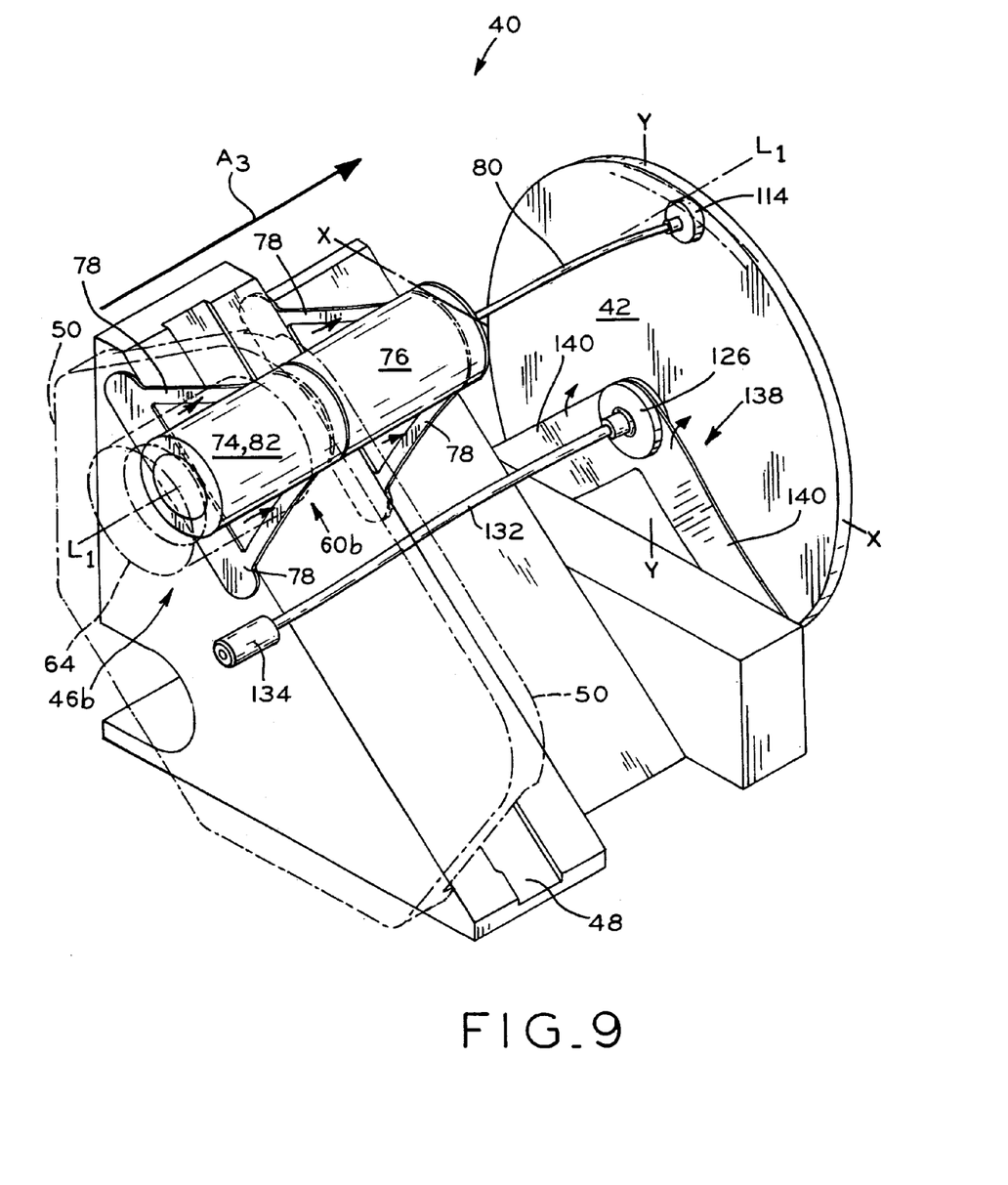
FIG. 9 is a partial perspective view of the steering mirror assembly, showing actuation of the second or upper actuator assembly to pivot the mirror in a first, forward direction about the horizontal X-axis, with the first or lower actuator assembly removed for clarity.
Figure 10:
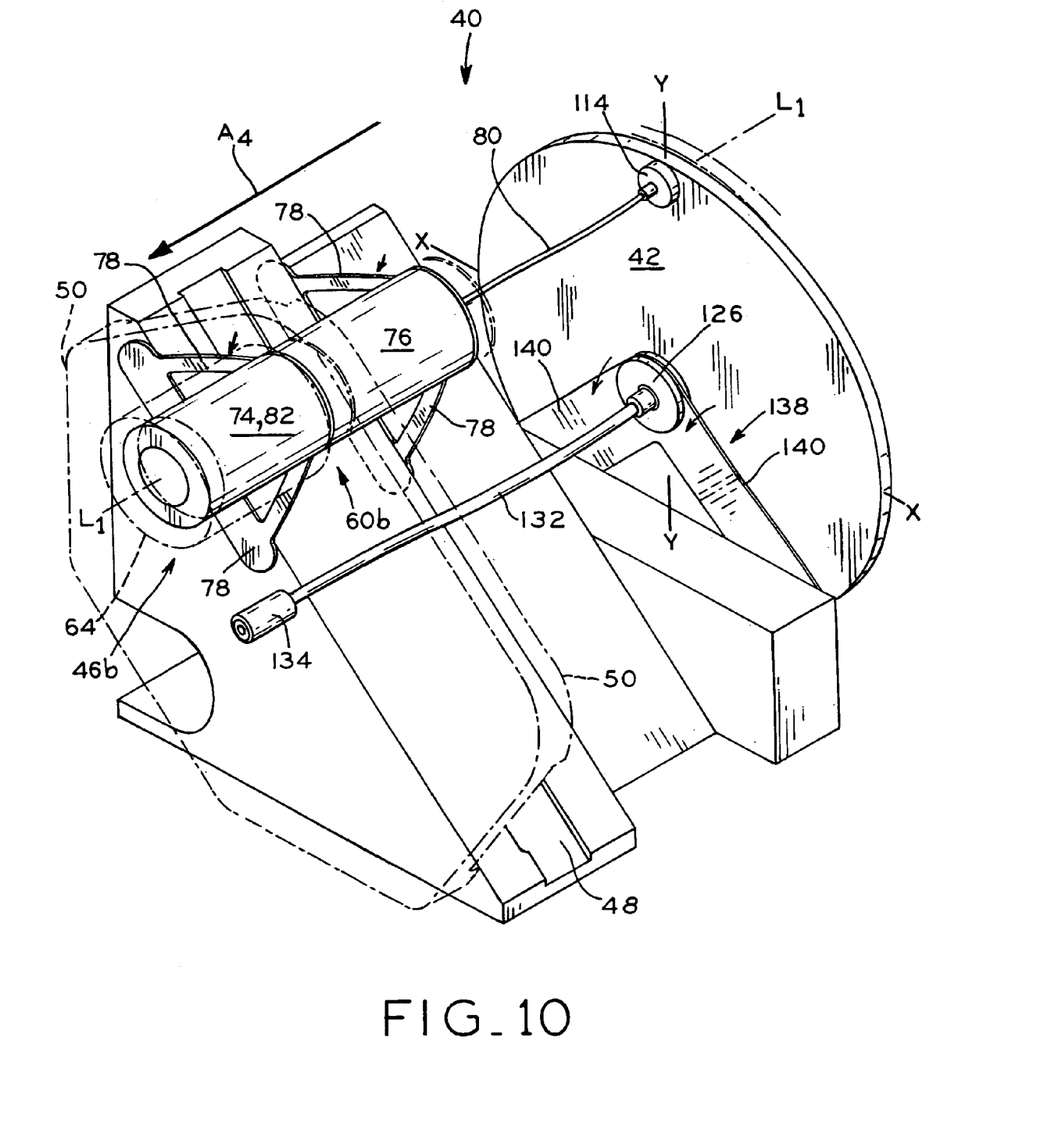
FIG. 10 is a partial perspective view of the steering mirror assembly, showing actuation of the second or upper actuator assembly to pivot the mirror in a second, rearward direction about the horizontal X-axis, with the first or lower actuator assembly removed for clarity.

Referring to FIGS. 9 and 10, bobbin assembly 60b of upper actuator assembly 46b is operable to pivot mirror 42 about the horizontal X-axis in first and second, forward and rearward directions along arrows $A_3$ (FIG. 9) and $A_4$ (FIG. 10), respectively, in the same manner as described above with respect to the pivoting of mirror 42 about the vertical Y-axis by bobbin assembly 60a of upper actuator assembly 46a. However, during pivoting of mirror 42 about the horizontal X-axis upon movement of bobbin assembly 60b, the legs 140 of mirror support flexure 138 undergo bending movement together in forward and reverse directions along a line defined by center rod flexure 132.

As shown in FIGS. 7–10, the bending of center rod flexure 132 takes up the foregoing twisting and bending movement of legs 140 of mirror support flexure 138. In this manner, center rod flexure 132 supports mirror 42 at a substantially fixed distance outwardly of back plate 50 of base 44, yet is bendable to allow the foregoing twisting and bending movement of legs 140 of mirror support flexure 138, such that center rod flexure 132 and mirror support flexure 138 together confine movement of mirror 42 to pivotal movement about the vertical Y-axis and/or the horizontal X-axis.

The foregoing support provided by support flexures 78 to bobbin assemblies 60a and 60b, the attachment of control rod flexures 80 between bobbin assemblies 60a and 60b and mirror 42, and the pivotal support provided to mirror 42 by center rod flexure 132 and mirror support flexure 138 operate to confine movement of mirror 42 to pivotal movement closely about the vertical Y-axis and/or the horizontal X-axis, and to substantially reduce or eliminate mechanical friction associated with the pivoting of mirror 42. Additionally, there is also no mechanical friction between bobbins 74 and field magnet housings 64.

Figure 11:
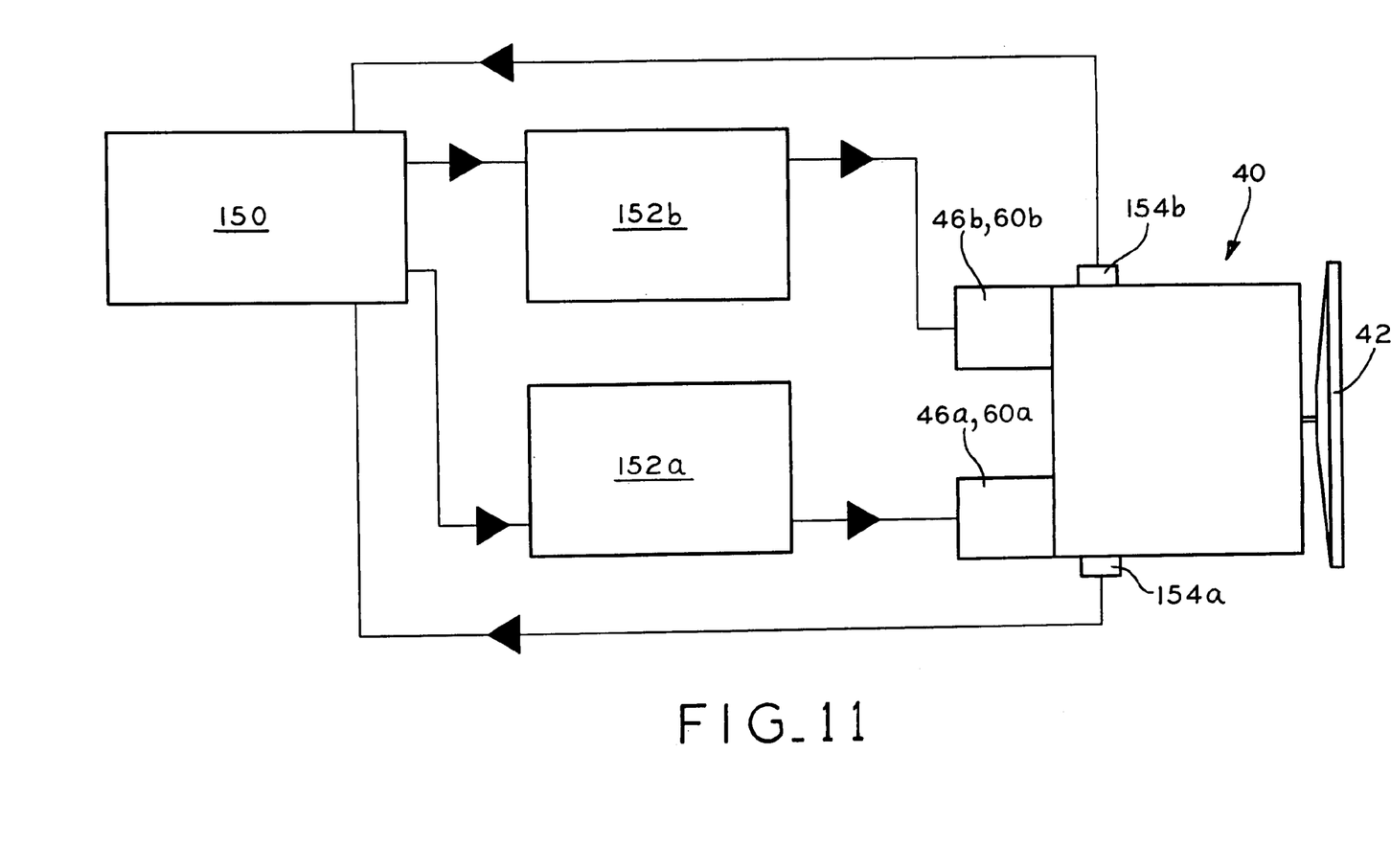
FIG. 11 is an electrical schematic of the steering mirror assembly.

Referring to FIG. 11, an electrical schematic of steering mirror assembly 40 is shown. Computer control 150 includes a microprocessor which is programmable to store and execute a predetermined cutting program. During execution of the cutting program, computer control 150 sends control signals to first and second amplifiers 152a and 152b which are associated with lower or first actuator assembly 46a and upper or second actuator assembly 46b, respectively. Amplifiers 152a and 152b provide electrical current in an alternating manner to lower actuator assembly 46a and to upper actuator assembly 46b, respectively, to cause forward and rearward movement of bobbin assemblies 60a and 60b thereof according to a predetermined movement sequence. Movement of bobbin assemblies 60a and 60b pivots mirror 42 as described above, which in turn directs laser beam 22 over a predetermined cutting path along substrate 24.

Computer control 150 also controls the operation of laser 28, including the power of laser 28 and whether laser 28 is activated. For example, computer control 150 may briefly de-activate laser 28 when necessary during a cutting operation, such as when the cutting operation requires making a first circular cut, followed by an adjacent, second circular cut. Also, computer control 150 may regulate the power output of laser 28 responsive to varying thicknesses of substrate material, for example. Further, computer control 150 may decrease the power of laser 28 during operations when laser beam 22 is moving more slowly across the substrate material, such as when cutting around a radiused corner, and computer control 150 may increase the power output of laser 28 when laser beam 22 is moving more rapidly along a straight line.

Optical feedback sensors 154a and 154b (also shown in FIGS. 2 and 3), are rigidly mounted to ends of sensor support block 156 (FIGS. 2 and 3) attached to pedestal 48 of base 44, and are disposed closely adjacent scale members 104 of scale cylinders 76 of each of bobbin assemblies 60a and 60b of lower and upper actuator assemblies 46a and 46b, and cooperate with scale members 104 to register the linear movement of scale cylinders 76 and bobbin assemblies 60a and 60b and provide position feedback data to computer control 150 to facilitate closed loop monitoring of the operation of laser cutting system 20.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A steering mirror assembly, comprising:
    a base;
    a mirror pivotally supported on said base; and
    at least one electromagnetic actuator assembly, comprising:
        a housing connected to said base;
        a bobbin assembly movable with respect to said housing, said bobbin assembly including a first portion disposed within said housing, and a second portion disposed externally of said housing and connected to said mirror, said second portion supported on said base by at least one support flexure, said at least one support flexure including opposite ends respectively connected to said base and to said second portion of said bobbin assembly, whereby linear movement of said bobbin assembly pivots said mirror about a first axis.

2. The steering mirror assembly of claim 1, further comprising a second said electromagnetic actuator assembly including a second bobbin assembly connected to said mirror, whereby linear movement of said bobbin assembly of said second electromagnetic actuator assembly pivots said mirror about a second axis.

3. The steering mirror assembly of claim 2, wherein said second axis is perpendicular to said first axis.

4. The steering mirror assembly of claim 1, wherein said mirror is pivotally supported on said base at a central location on said mirror, and said second portion of said bobbin assembly is connected to said mirror at another location on said mirror spaced from said central location.

5. The steering mirror assembly of claim 1, wherein said second portion of said bobbin assembly is connected to said mirror by a control rod flexure.

6. The steering mirror assembly of claim 1, wherein said housing comprises a magnet and said first portion of said bobbin assembly comprises a bobbin with a winding, said bobbin movable in first and second opposite directions within said housing responsive to passage of an alternating current through said winding.

7. A steering mirror assembly, comprising:
    a base;
    a mirror pivotally supported on said base; and
    at least one electromagnetic actuator assembly, comprising:
        a housing connected to said base;
        a bobbin assembly movable with respect to said housing, said bobbin assembly including a first portion disposed within said housing, and a second portion disposed externally of said housing and connected to said mirror, said second portion of said bobbin assembly supported on said base by a pair of support flexures which are spaced from one another, whereby linear movement of said bobbin assembly pivots said mirror about a first axis.

8. A steering mirror assembly, comprising:
    a base;
    a mirror pivotally supported on said base; and
    at least one electromagnetic actuator assembly, comprising:
        a housing connected to said base;
        a bobbin assembly movable with respect to said housing, said bobbin assembly including a first portion disposed within said housing, and a second portion disposed externally of said housing and connected to said mirror, said second portion supported on said base by at least one support flexure, whereby linear movement of said bobbin assembly pivots said mirror about a first axis, said mirror pivotally supported on said base by a flexure assembly, said flexure assembly comprising:
    a substantially planar mirror support flexure connected at one end thereof to said base and at another end thereof to a central portion of said mirror; and
    a center rod flexure connected at one end thereof to said base and at an opposite end thereof to said central portion of said mirror.

9. A steering mirror assembly, comprising:
    a base;
    a mirror pivotally supported on said base; and
    at least one electromagnetic actuator assembly, comprising:
        a housing connected to said base;
        a bobbin assembly movable with respect to said housing, said bobbin assembly including a first portion disposed within said housing, and a second portion disposed externally of said housing and connected to said mirror, said second portion supported on said base by at least one support flexure, whereby linear movement of said bobbin assembly pivots said mirror about a first axis, said bobbin assembly further including position identifying structure and said base includes a fixed sensor disposed closely proximate said position identifying structure of said bobbin assembly.

10. A steering mirror assembly, comprising:
    a base;
    a mirror pivotally supported on said base;
    a first electromagnetic actuator assembly, comprising:
        a housing connected to said base;
        a bobbin assembly including a first portion movable within said housing and a second portion connected to said mirror at a first location on said mirror, said second portion supported on said base by a flexure assembly including opposite ends respectively connected to said base and to said second portion of said bobbin assembly to substantially confine movement of said second portion linearly to thereby pivot said mirror about a first axis; and
    a second electromagnetic actuator assembly, comprising:
        a housing connected to said base;
        a bobbin assembly including a first portion movable within said housing and a second portion connected to said mirror at a second location on said mirror angularly spaced from said first location, said second portion supported on said base by a flexure assembly including opposite ends respectively connected to said base and to said second portion of said bobbin assembly to substantially confine movement of said second portion linearly to thereby pivot said mirror about a second axis.

11. The steering mirror assembly of claim 10, wherein said first axis is horizontal and said second axis is vertical.

12. The steering mirror assembly of claim 10, wherein said mirror is pivotally supported on said base at a central location on said mirror, and said second portions of said bobbin assemblies are connected to said mirror at other locations on said mirror spaced from said central location.

13. The steering mirror assembly of claim 10, wherein in each of said first and second electromagnetic actuators, said housing comprises a magnet and said first portion of said bobbin assembly comprises a bobbin with a winding, said bobbin movable in first and second opposite directions within said housing responsive to passage of an alternating current through said winding.

14. A steering mirror assembly, comprising:
a base;
a mirror pivotally supported on said base;
a first electromagnetic actuator assembly, comprising:
  a housing connected to said base;
  a bobbin assembly including a first portion movable within said housing and a second portion connected to said mirror at a first location on said mirror, said second portion supported on said base by a flexure assembly substantially confining movement of said second portion linearly to thereby pivot said mirror about a first axis; and
a second electromagnetic actuator assembly, comprising:
  a housing connected to said base;
  a bobbin assembly including a first portion movable within said housing and a second portion connected to said mirror at a second location on said mirror angularly spaced from said first location said second portion supported on said base by a flexure assembly substantially confining movement of said second portion linearly to thereby pivot said mirror about a second axis, each said flexure assembly comprising:
a pair of spaced substantially planar support flexures each connected at one end thereof to said base and at another end thereof to said bobbin assembly; and
a control rod flexure connected at one end thereof to said bobbin assembly and at an opposite end thereof to said mirror.

15. A steering mirror assembly, comprising:
a base;
a mirror pivotally supported on said base;
a first electromagnetic actuator assembly, comprising:
  a housing connected to said base;
  a bobbin assembly including a first portion movable within said housing and a second portion connected to said mirror at a first location on said mirror, said second portion supported on said base by a flexure assembly substantially confining movement of said second portion linearly to thereby pivot said mirror about a first axis; and
a second electromagnetic actuator assembly, comprising:
  a housing connected to said base;
  a bobbin assembly including a first portion movable within said housing and a second portion connected to said mirror at a second location on said mirror angularly spaced from said first location said second portion supported on said base by a flexure assembly substantially confining movement of said second portion linearly to thereby pivot said mirror about a second axis; and
said mirror pivotally supported on said base by a second flexure assembly, said second flexure assembly comprising:
  a substantially planar mirror support flexure connected at one end thereof to said base and at another end thereof to a central portion of said mirror; and
  a center rod flexure connected at one end thereof to said base and at an opposite end thereof to said central portion of said mirror.

16. A steering mirror assembly, comprising:
a base;
a mirror pivotally supported on said base;
a first electromagnetic actuator assembly, comprising:
  a housing connected to said base;
  a bobbin assembly including a first portion movable within said housing and a second portion connected to said mirror at a first location on said mirror, said second portion supported on said base by a flexure assembly substantially confining movement of said second portion linearly to thereby pivot said mirror about a first axis; and
a second electromagnetic actuator assembly, comprising:
  a housing connected to said base;
  a bobbin assembly including a first portion movable within said housing and a second portion connected to said mirror at a second location on said mirror angularly spaced from said first location said second portion supported on said base by a flexure assembly substantially confining movement of said second portion linearly to thereby pivot said mirror about a second axis, said bobbin assemblies each further including position identifying structure and said base includes a pair of fixed sensors respectively disposed closely proximate said position identifying structures of said bobbin assemblies.

17. A steering assembly, comprising:
a base;
an electromagnetic energy-receiving component pivotally supported on said base; and
at least one electromagnetic actuator assembly, comprising:
  a housing connected to said base;
  a bobbin assembly movable with respect to said housing, said bobbin assembly including a first portion disposed within said housing, and a second portion disposed externally of said housing and connected to said electromagnetic energy-receiving component, said second portion supported on said base by at least one support flexure, said at least one support flexure including opposite ends respectively connected to said base and to said second portion of said bobbin assembly, whereby linear movement of said bobbin assembly pivots said electromagnetic energy-receiving component about a first axis.

18. The steering assembly of claim 17, wherein said electromagnetic energy-receiving component includes a reflective face.

19. The steering assembly of claim 17, wherein said electromagnetic energy-receiving component includes a plurality of substantially hexagonal-shaped recesses therein.

20. The steering assembly of claim 17, wherein said electromagnetic energy-receiving component is substantially planar.

21. The steering assembly of claim 17, wherein said bobbin assembly includes position identifying structure and said base includes a fixed sensor disposed closely proximate said position identifying structure of said bobbin assembly.

22. The steering assembly of claim 17, wherein said second portion of said bobbin assembly is supported on said base by a pair of said support flexures which are spaced from one another.

23. The steering assembly of claim 17, wherein said electromagnetic energy-receiving component is pivotally supported on said base by a flexure assembly comprising:
   a substantially planar support flexure connected at one end thereof to said base and at another end thereof to a central portion of said electromagnetic energy-receiving component; and
   a center rod flexure connected at one end thereof to said base and at an opposite end thereof to said central portion of said electromagnetic energy-receiving component.

24. A steering assembly, comprising:
   a base;
   an electromagnetic energy-receiving component pivotally supported on said base by at least one first support flexure; and
   at least one electromagnetic actuator assembly, comprising:
      a housing connected to said base;
      a bobbin assembly movable with respect to said housing, said bobbin assembly including a first portion disposed within said housing, and a second portion disposed externally of said housing and connected to said electromagnetic energy-receiving component, said second portion supported on said base by at least one second flexure, at least one of said first and second flexures being substantially V-shaped, whereby linear movement of said bobbin assembly pivots said electromagnetic energy-receiving component about a first axis.

25. The steering assembly of claim 24, wherein each of said first and second flexures is substantially V-shaped.

* * * * *